Oct. 25, 1927.
G. LYTLE
1,646,486
HARROW ATTACHMENT FOR PLOWS
Filed May 22, 1926
2 Sheets-Sheet 2
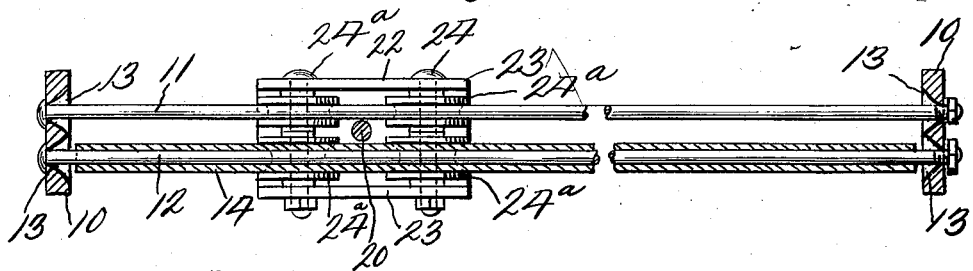
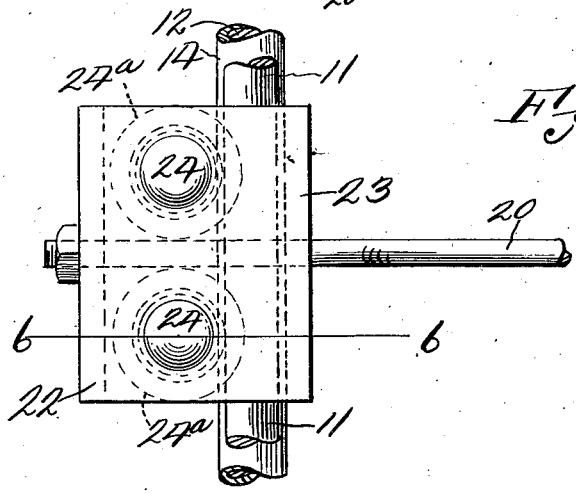
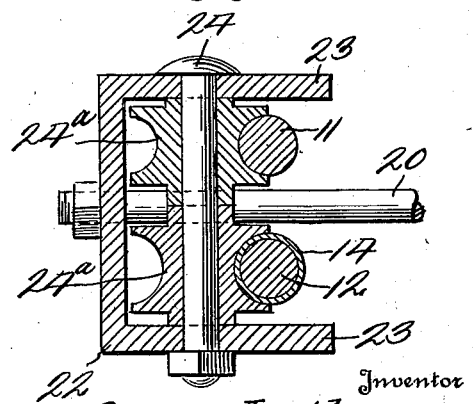
Inventor
George Lytle
By Philip A. H. Sewell
Attorney Patented Oct. 25, 1927.

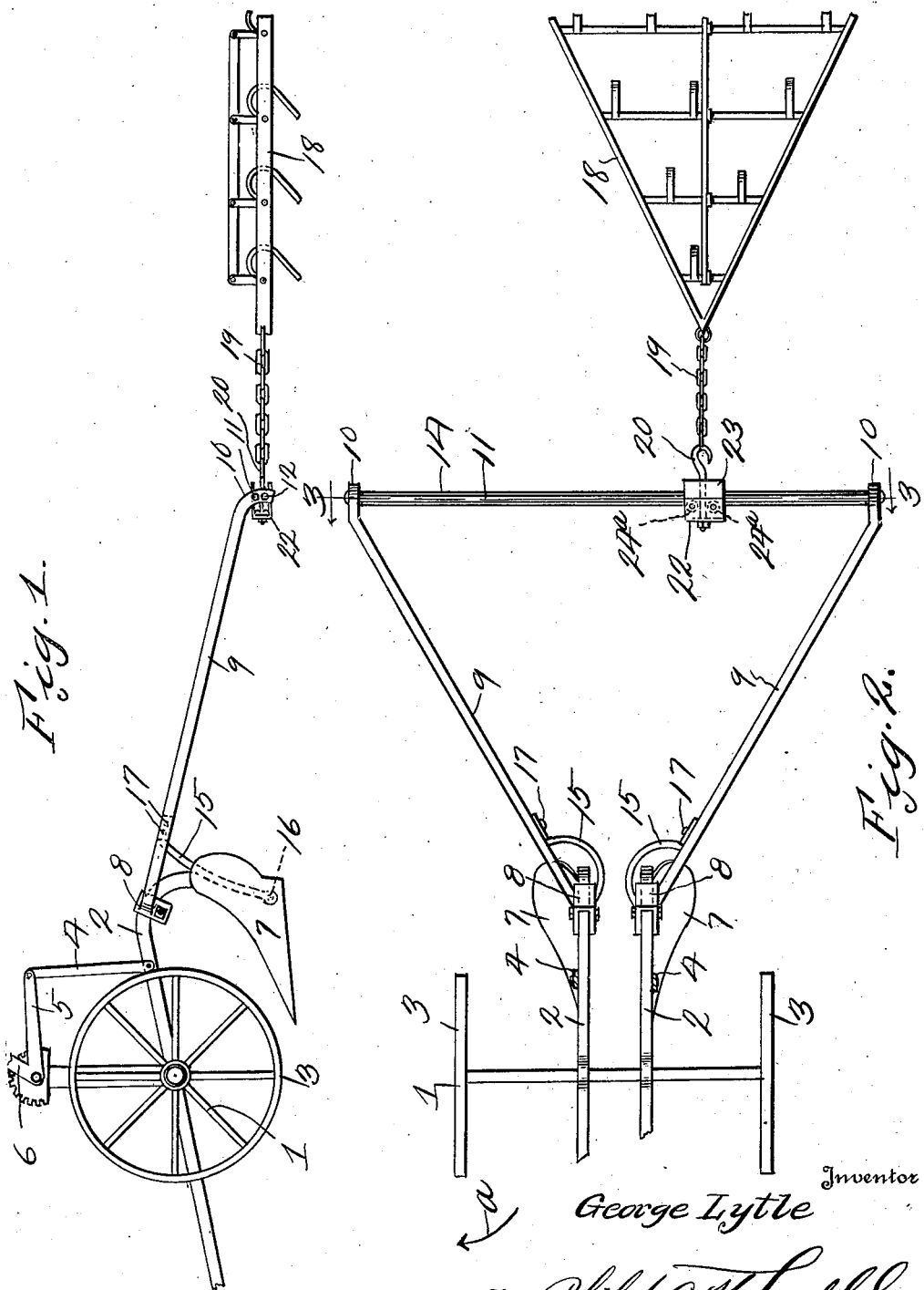

1,646,486

UNITED STATES PATENT OFFICE.

GEORGE LYTLE, OF PARMA, IDAHO.

HARROW ATTACHMENT FOR PLOWS.

Application filed May 22, 1926. Serial No. 110,928.

The invention relates to harrow attachments for plows, particularly for two way plows and has for its object to provide a device of this character supported and carried by the plow beam and comprising a transversely disposed guide member on which is slidably mounted a trolley, which trolley is connected to a harrow, said guide member is inclined downwardly transversely upon the lowering of one of the plows in the direction of turn of the plows thereby causing the trolley to move downwardly to the low end of the guide member for positioning the harrow behind the lowered plow.

A further object is to provide the plow beams with rearwardly diverging rigidly supported arms, the ends of which are connected together by spaced parallel transversely disposed guide rods on which the trolley is mounted, and which trolley is provided with grooved wheels engaging the forward sides of the guide rods and with a rearwardly extending draft hook to which the harrow is attached.

A further object is to provide a draft trolley for harrows and adapted to be moved and mounted on transversely disposed rods, said trolley comprising a U-shaped member arching the forward sides of the guide rods and provided with spaced pairs of superimposed grooved rollers engaging the forward sides of the guide rods. Also to provide a draft hook connected to the U-shaped member forwardly of the rods and extending rearwardly between the rollers and the rods and to which the harrow is attached and which rearwardly extending hook cooperates with the rods for preventing downward or upward displacement of the trolley.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a side elevation of a conventional form of wheel plow, showing the device applied thereto.

Figure 2 is a top plan view of the plow and harrow showing the draft appliance.

Figure 3 is a transverse sectional view taken on line 3—3 of Figure 2.

Figure 4 is a top plan view of the trolley.

Figure 5 is a side elevation of the trolley.

Figure 6 is a vertical sectional view through the trolley taken on line 6—6 of Figure 4.

Referring to the drawing, the numeral 1 designates a conventional form of two way plow, which plow comprises spaced plow beams 2 which are moved upwardly and downwardly through the usual mechanism and supporting wheels 3. The rear ends of the plow beams 2 are raised and lowered through any suitable mechanism, however for purposes of illustration upwardly extending links 4 are shown, which links 4 are connected to arms 5 of levers 6, which is a conventional construction. The rear ends of the beams 2 curve downwardly and are provided with plow shares 7 which are right and left handed, and which are of conventional construction.

Secured to the plow beams 2 adjacent their rear curved ends by means of clamps 8 are rearwardly extending diverging arms 9, the rear ends of which are preferably provided with downwardly curved arms 10 in parallel planes. The arms 10 are connected together by transversely disposed spaced guide rods 11 and 12, the ends of which guide rods extend through enlarged apertures 13 in the downwardly extending arms 10 whereby when either plow is lowered the arm 9 carried by its beam may move downwardly thereby inclining the rods 11 and 12, and at the same time maintaining said rods in substantially parallel relation. The lower rod 12 is provided with a sleeve 14, which sleeve has its ends terminating adjacent the downwardly extending arms 10 for preventing inward movement of the rear ends of the diverging arms 9 in relation to each other, but at the same time allowing free upward and downward movement of the arms 9 in relation to each other during the movement of either plow beam 2. Arms 9 are additionally braced by the brace arms 15, which brace arms curve inwardly, downwardly and outwardly and are anchored at 16 to the land sides of the plows and at 17 to the arms 9, however it is to be understood that this structure may vary according to the make and design of the wheeled plow.

Disposed rearwardly of the transversely disposed bars 11 is a conventional form of harrow 18, and which harrow is disposed rearwardly of the plow shares and is adapted to be transversely shifted upon turning of the plow to assume positions rearwardly of whichever plow share 7 is in lowered position for harrowing the ground turned by said lowered plow share. Harrow 18 at its forward end is provided with a chain 19 which extends forwardly and is connected to a draft hook 20. The draft hook 20 extends forwardly between the transversely disposed rods 11 and is connected to the front wall 21 of a U-shaped member 22 which arches the front sides of the rods 11, and has its horizontal arms 23 above and below the transverse rods. Rotatably mounted on bolts 24 and between the arms 23 are grooved pairs of superimposed rollers 24$^a$, which rollers 24$^a$ engage the forward sides of the rod 11 and the sleeve 14, and in connection with the member 22 forms a transversely movable trolley. Assuming the plow makes a turn in the direction of the arrow $a$, Figure 2, and at which time the plow share 7 on the offside of the plow is raised, and the plow share 7 on the other side is lowered, the transversely disposed rods are lowered at one end, and the trolley hitch will move to the lower end of the rods, thereby causing the harrow to assume a position behind the lowered plow, and the same operation takes place when a turn is made at the end of each furrow, therefore it will be seen the harrow will automatically shift and assume its proper position behind the lowered plow shaft.

From the above it will be seen that a travelling draft hitch for harrows is provided, which hitch is mounted on transversely disposed rods supported at their ends by rearwardly extending arms carried by adjacent plow beams and said hitch will automatically shift transversely according to which plow is lowered. It will also be seen that the device is simple in construction, positive in its operation and may be easily and quickly applied to the plow beams without varying the construction thereof.

The invention having been set forth what is claimed as new and useful is:—

1. The combination with adjacent plow beams movable in vertical longitudinal planes, a harrow disposed rearwardly of the plow beams, of a draft connection between said plow beams and harrow, said connection comprising rearwardly diverging arms carried by the beams, spaced transversely disposed guide rods connecting the ends of the diverging arms, means whereby the ends of said guide rods will lower or raise with the movement of the plow beam, a trolley hitch mounted on the guide rods, said trolley hitch comprising spaced pairs of grooved rollers engaging the forward sides of the guide rods, a draft hook carried by said trolley and extending rearwardly between the pairs of rollers and guide rods and a connection between said draft hook and the harrow.

2. The combination with adjacent plow beams pivotally movable in vertical longitudinal parallel planes, a harrow disposed rearwardly of the plow beams, of a draft connection between said plow beams and harrow, said draft connection comprising rearwardly extending arms carried by the beams, spaced transversely disposed guide rods connecting the ends of the arms, a sleeve carried by one of said guide rods and cooperating with the arms for preventing excessive inward movement thereof but allowing vertical movement of the arms in relation to each other, a trolley hitch mounted on the guide rod and sleeve at the forward side thereof, said trolley hitch comprising spaced superimposed grooved rollers engaging the forward sides of the rod and sleeve, a draft hook carried by said trolley and extending rearwardly between the pairs of rollers and guide rods, and a connection between said draft hook and the harrow.

In testimony whereof I hereunto affix my signature.

GEORGE LYTLE.